United States Patent
Filsfils et al.

(10) Patent No.: US 10,757,231 B2
(45) Date of Patent: Aug. 25, 2020

(54) PROVIDING NETWORK EFFICIENCIES IN FORWARDING PACKETS AMONG PROVIDER NETWORKS AND APPLYING SEGMENT ROUTING POLICIES

(71) Applicant: Cisco Technology, Inc., San Jose, CA (US)

(72) Inventors: Clarence Filsfils, Brussels (BE); Francois Clad, Strasbourg (FR); Pablo Camarillo Garvia, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/981,232

(22) Filed: May 16, 2018

(65) Prior Publication Data

US 2018/0375764 A1    Dec. 27, 2018

Related U.S. Application Data (60) Provisional application No. 62/525,439, filed on Jun. 27, 2017.

(51) Int. Cl.
*H04L 29/06* (2006.01)
*H04L 29/08* (2006.01)
(Continued)

(52) U.S. Cl.
CPC .......... *H04L 69/22* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 8,059,661 B2 * 11/2011 Patel ................ H04L 29/12301
370/389
9,178,816 B1 * 11/2015 Ojha ...................... H04L 45/74
(Continued)

OTHER PUBLICATIONS

Filsfls et al., "SRv6 Network Programming," draft-filsfils-spring-srv6-network-programming-04, Mar. 4, 2018, The Internet Society, Reston, VA, USA (fifty-seven pages).
(Continued)

*Primary Examiner* — Chi H Pham
*Assistant Examiner* — Vladislav Y Agureyev
(74) *Attorney, Agent, or Firm* — The Law Office of Kirk D. Williams (57) ABSTRACT

In one embodiment, a third-party client network access device sends Internet Protocol (IP) encapsulating packets with a predetermined destination address of a node of the network client service provider (NCSP), with these IP encapsulating packets encapsulating original data packets. These IP encapsulating packets are communicated through the ISP network being used by the NCSP in providing its network services. The predetermined destination address, which is typically also a segment identifier, causes network service processing (e.g., according to a corresponding segment routing function) of the received packet by the node of the NCSP. This processing typically includes creating a segment routing packet encapsulating the original packet (extracted from the received IP encapsulating packet) with its segment list(s) being populated with segment identifier(s) according to a current NCSP segment routing policy reflective of a sequence of forwarding and service chaining operations of the NCSP service offering.

18 Claims, 5 Drawing Sheets

(51) Int. Cl.
*H04L 12/721* (2013.01)
*H04L 12/46* (2006.01)
*H04L 12/741* (2013.01)
*H04L 29/12* (2006.01)
*H04L 12/931* (2013.01)
*H04L 12/749* (2013.01)
*H04L 12/26* (2006.01)

(52) U.S. Cl.
CPC .............. *H04L 45/14* (2013.01); *H04L 45/34* (2013.01); *H04L 45/74* (2013.01); *H04L 45/741* (2013.01); *H04L 49/35* (2013.01); *H04L 61/2007* (2013.01); *H04L 67/10* (2013.01); *H04L 67/327* (2013.01); *H04L 69/324* (2013.01); *H04L 43/028* (2013.01); *H04L 45/745* (2013.01); *H04L 61/2503* (2013.01); *H04L 61/6059* (2013.01); *H04L 63/0272* (2013.01); *H04L 2212/00* (2013.01)

(56) References Cited

U.S. PATENT DOCUMENTS

| | | | | |
|---|---|---|---|---|
| 9,258,765 | B1* | 2/2016 | daCosta | H04W 40/24 |
| 9,537,769 | B2 | 1/2017 | Bryant et al. | |
| 2011/0075667 | A1* | 3/2011 | Li | H04L 29/12018 |
| | | | | 370/392 |
| 2011/0110375 | A1* | 5/2011 | Boucadair | H04L 61/6004 |
| | | | | 370/393 |
| 2013/0227284 | A1* | 8/2013 | Pfeffer | H04L 63/102 |
| | | | | 713/168 |
| 2014/0032782 | A1* | 1/2014 | Jiang | H04L 45/00 |
| | | | | 709/238 |
| 2014/0098671 | A1* | 4/2014 | Raleigh | H04M 15/41 |
| | | | | 370/235 |
| 2014/0269422 | A1* | 9/2014 | Filsfils | H04L 41/12 |
| | | | | 370/254 |
| 2015/0109902 | A1* | 4/2015 | Kumar | H04L 41/0668 |
| | | | | 370/219 |
| 2015/0256456 | A1* | 9/2015 | Previdi | H04L 45/745 |
| | | | | 370/392 |
| 2015/0304206 | A1* | 10/2015 | Filsfils | H04L 45/04 |
| | | | | 709/238 |
| 2015/0326675 | A1* | 11/2015 | Kini | H04L 43/10 |
| | | | | 709/224 |
| 2016/0014071 | A1* | 1/2016 | Asati | H04L 61/6059 |
| | | | | 709/245 |
| 2016/0021400 | A1* | 1/2016 | Surcouf | G06F 16/00 |
| | | | | 725/93 |
| 2016/0248860 | A1* | 8/2016 | Dunbar | H04L 67/16 |
| 2016/0285780 | A1* | 9/2016 | Strijkers | H04W 88/02 |
| 2016/0294644 | A1* | 10/2016 | Pacella | H04L 41/5054 |
| 2016/0359672 | A1* | 12/2016 | Blair | H04L 41/5019 |
| 2017/0005922 | A1* | 1/2017 | Tantsura | H04L 45/72 |
| 2017/0012873 | A1* | 1/2017 | Berg | H04L 12/4633 |
| 2017/0012895 | A1* | 1/2017 | Zhao | H04L 47/724 |
| 2017/0134274 | A1* | 5/2017 | Ara jo | H04L 45/74 |
| 2017/0141963 | A1* | 5/2017 | Chalapathy | H04L 12/4641 |
| 2017/0310594 | A1* | 10/2017 | Kotha | H04L 45/741 |
| 2017/0339052 | A1* | 11/2017 | Arora | H04L 45/28 |
| 2017/0346707 | A1* | 11/2017 | Menon | H04L 61/2521 |
| 2018/0006948 | A1* | 1/2018 | Torvi | H04L 43/0882 |
| 2018/0006995 | A1* | 1/2018 | Bickhart | H04L 45/66 |
| 2018/0219783 | A1* | 8/2018 | Pfister | H04L 67/1023 |
| 2018/0241718 | A1* | 8/2018 | Stair | H04L 63/108 |
| 2018/0295156 | A1* | 10/2018 | Kolbe | H04L 12/4633 |

OTHER PUBLICATIONS

Filfls et al., "Segment Routing Architecture," draft-ietf-spring-segment-routing-15, Jan. 25, 2018, The Internet Society, Reston, VA, USA (thirty-one pages).
Previdi et al., "IPv6 Segment Routing Header (SRH)," draft-ietf-6man-segment-routing-header-10, Mar. 17, 2018, The Internet Society, Reston, VA, USA (thirty-three pages).
Rekhter et al., "A Border Gateway Protocol 4 (BGP-4)," RFC 4271, Jan. 2006, The Internet Society, Reston, VA, USA (104 pages).
Bates et al., "Multiprotocol Extensions for BGP-4," RFC 2283, Feb. 1998, The Internet Society, Reston, VA, USA (nine pages).
Deering et al., "Internet Protocol, Version 6 (IPv6) Specification," RFC 2460, Dec. 1998, The Internet Society, Reston, VA, USA (thirty-nine pags).
S. Deering and R. Hinden, "Internet Protocol, Version 6 (IPv6) Specification," RFC 8200, Jul. 2017, The Internet Society, Reston, VA, USA (forty-two pages).
T. Bates et al., "Multiprotocol Extensions for BGP-4," RFC 4760, Jan. 2007, The Internet Society, Reston, VA, USA (twelve pages).
Rosen et al., "Multiprotocol Label Switching Architecture," RFC 3031, Jan. 2001, The Internet Society, Reston, VA, USA (sixty-one pages).
"Information technology—Telecommunications and information exchange between systems—Intermediate System to Intermediate System intra-domain routeing information exchange protocol for use in conjunction with the protocol for providing the connectionless-mode network service (ISO 8473)," Second Edition, Nov. 15, 2002, ISO/IEC 2002, Switzerland (210 pages).

\* cited by examiner

PROVIDING NETWORK EFFICIENCIES IN FORWARDING PACKETS AMONG PROVIDER NETWORKS AND APPLYING SEGMENT ROUTING POLICIES

CROSS-REFERENCE TO RELATED APPLICATIONS

This application claims the benefit of U.S. Provisional Application No. 62/525,439, filed Jun. 27, 2017, which is hereby incorporated by reference in its entirety.

TECHNICAL FIELD

The present disclosure relates generally to sending of packets in packet network, such as, but not limited to, packets associated with third-party clients of a network client service provider using the network infrastructure and services of another provider.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with providing network efficiencies in forwarding packets among provider networks and applying segment routing policies.

A network access device of a third-party client generates an Internet Protocol (IP) encapsulating packet encapsulating an original IP packet that is being transported through one or more Internet Service Provider (ISP) networks with one or more network client service provider (NCSP) network services applied to the packet. The NCSP is a network service provider that uses network infrastructure and services of an ISP in providing their network services to third-party clients. In one embodiment, the network access device receives (and then encapsulates) the particular IP packet from a host device of the third-party client. In one embodiment, the network access device originates both the original IP packet and the IP encapsulating packet. The IP encapsulating packet has an IP destination address that is a segment identifier of a particular network service provided by the NCSP, and also is an IP address of a particular network device of the NCSP. In one embodiment, the connectivity of the network access device to the ISP is changed, with subsequent IP encapsulating packets still using the same IP destination address of the particular network device of the NCSP and segment identifier of the particular network service.

The IP encapsulating packet is communicated from the network access device to an edge router in a network of the ISP, with the IP encapsulating packet being forwarded to the particular network device. Responsive to the IP destination address of the received IP encapsulating packet, the particular network device operates according to the particular network service that includes originating a IPv6 segment routing (SRv6) packet encapsulating the original IP packet (extracted from the received IP encapsulating packet) with the SRv6 packet including a segment list of one or more segment identifiers of a segment routing policy. The SRv6 packet is forwarded and processed according to the particular segment list in NCSP and ISP networks. In one embodiment, an egress router of the ISP decapsulates the original IP packet from the received SRv6 packet, and then sends the original packet from the egress router.

In one embodiment, the NCSP configures the network access device to use the particular IP destination address as the IP destination address for all IP encapsulating packets, and subsequently provides (e.g., ships, delivers) the network access device to the third-party client.

In one embodiment, a specific IP packet having a destination address of the host device is received by a router in the ISP network. In response to a classification of the specific IP packet, the router encapsulates the specific packet in an IP encapsulating packet having an IP destination address of a segment identifier of a network service of the NCSP, with the specific IP destination address being an IP address of a specific network device of the NCSP. The IP encapsulating packet is communicated to the specific network device. Responsive to the IP destination address of the IPv6 encapsulating packet, the specific network device operates according to the specific network service that includes originating an SRv6 packet encapsulating the specific IP packet (extracted from the received specific IP encapsulating packet). The SRv6 packet is forwarded to the edge router, which decapsulates and sends the specific IP packet to the network access device, which then communicates the specific IP packet to the host device or host device process within the network access device.

2. Description

Disclosed are, inter alia, methods, apparatus, computer-storage media, mechanisms, and means associated with providing network efficiencies in forwarding packets among provider networks and applying segment routing policies. As used herein segment routing includes using Internet Protocol Version 4 and/or 6 (IPv4 and/or IPv6) addresses as segment identifiers (SIDs). Further, segment routing includes IPv6 SR (SRv6) and/or IPv4 (SRv4).

The terms "node" or "network node" are used herein to refer to a router or host. The term "route" is used herein to refer to a fully or partially expanded prefix/route (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. Also, as used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1A:
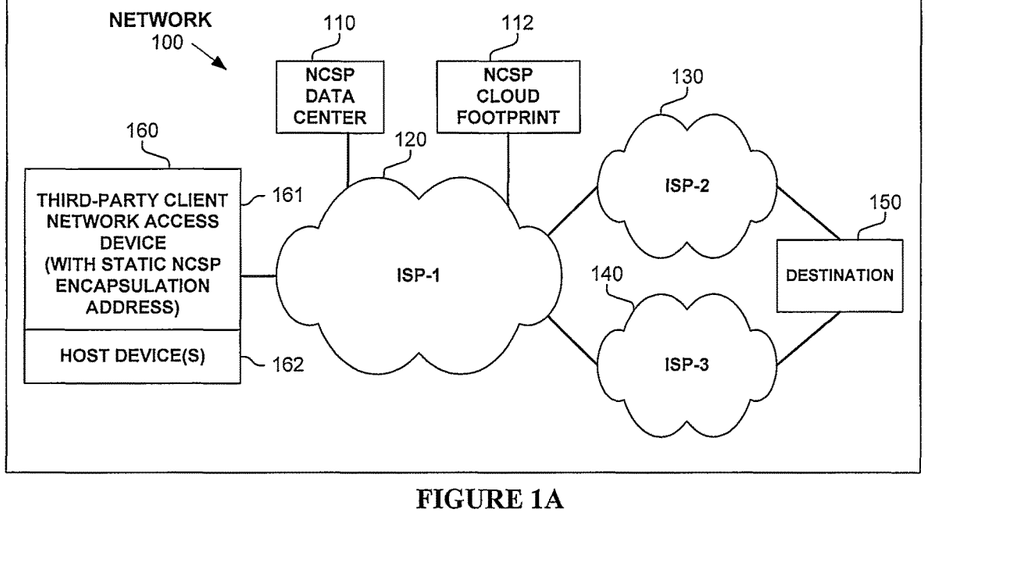
FIG. 1A illustrates a network operating according to one embodiment.

FIG. 1A illustrates an overall network 100 operating according to one embodiment. A network client of an Internet Service Provider has the ability to resell the access service to third-party clients. As used herein, a network client service provider (NCSP) refers to a service provider that uses network infrastructure (e.g., communication bandwidth) and services (e.g., communications facilities, packet forwarding services, segment routing processes) of an Internet Service Provider (ISP) to provide network services to third-party clients. In one embodiment, an NCSP provides Internet access services, mobile network services and/or other network/communications services.

Shown in FIG. 1A are three ISP's: ISP-1 120, ISP-2 130, and ISP-3 140. A network client service provider (NCSP) uses the network infrastructure and services of ISP-1 120 to provide, inter alia, Internet access services to third-party client host device(s) 162 using a network access device 161 that sends IP encapsulating packets with a predetermined NCSP destination. In this manner, the amount of routing and/or forwarding state required to be stored in an edge node of ISP-1 120 connected to network access device 161 is significantly decreased. Additionally, the packet processing resources of this edge node required for processing third-party IP packets is significantly decreased as no packet classification operation is required; rather, the edge node simply forwards the IP encapsulating packets based on its destination address.

In one embodiment, end user host device 162 is communicatively coupled to network access device 161 via a wireless or wired local area network. For example, a computer or multimedia smart phone (e.g., host device) 162 connects via a router, modem, wireless access point and/or other communications device 161 (e.g., over fiber, digital subscriber line/DSL, WIFI) to ISP-1 120. Host device 162 originates (and consumes) packets that are communicated with network access device 161, which performs IP encapsulation (using the configured static NCSP destination address) and decapsulation as described herein. In one embodiment, the same configured static NCSP destination address is used in sent encapsulating packets even when the connectivity point to ISP-1 120 changes (e.g., due to a change in residence location, mobile connectivity).

In one embodiment, a single device 160 operates as both the network access device 161 and host device 162. For example, natively or due to a changed mode or service of the same computer or multimedia smart phone (host device) 162 causes connection to a cellular or wireless access service that directly or indirectly provides communication to an edge node of ISP-1 120, and causes host device to function as device 160, operating as both the network access device 161 and host device 162. Device 160 sends and receives IP encapsulating packets encapsulating original packets being communicated, including sending IP encapsulating packets using the configured static NCSP destination address as described herein.

Also shown in FIG. 1A is a NCSP data center 110 and an NCSP cloud footprint 112. In one embodiment, the NCSP requires each native IP packet to be encapsulated in an IP encapsulating packet with a destination address of a network node (e.g., physical or virtual router) in NCSP data center 110 or NCSP cloud footprint 112.

In one embodiment, this destination address is also an SRv6 segment identifier or other value (IPv4 destination address and UDP or TCP port number) that causes invocation of particular network service functionality. In one embodiment, this particular network service functionality includes creating an SRv6 packet encapsulating the original packet (extracted from the IP encapsulating packet) with segment list of one or more segment identifiers of the corresponding segment routing policy. In one embodiment, these segment identifiers cause one or more particular network services (e.g., firewall, collecting billing information, quality of service differentiation, forwarding policy defining the path taken through NCSP data center 110, NCSP cloud footprint 112, and IPS-1 120) to be applied within NCSP data center 110, NCSP cloud footprint 112, and/or ISP-1 120 to the SRv6 packet.

In one embodiment, an egress edge node of ISP-1 120 decapsulates the original packet from the SRv6 packet, with the original packet being forwarded according to current routing and forwarding information. In one embodiment, the SRv6 is forwarded according to a segment identifier that is an address of a particular edge node of ISP-1 120 defined by the segment routing policy for exiting ISP-1 120. In one embodiment, this segment identifier defines, by the egress node selected and/or function defined in the segment identifier, the next ISP-2 130 or ISP-3 140 to which to forward the decapsulated original packet, such as, but not limited to on its way to destination 150.

In one embodiment, network access device 161 is configured by the NCSP prior to delivering it to the third-party client with an address (e.g., IPv6 address, IPv4 address and UDP or TCP port number) of a network node in NCSP data center 110 or NCSP cloud footprint 112. In one embodiment, this address is also a segment identifier (e.g., binding SID) of a network service that is invoked in response to receipt of the IPv6 packet with the address as its destination address.

In one embodiment, network access device 161 is configured to use the address during a setup procedure that receives the address via connectivity to a configuration server of the NCSP or ISP-1 or via a user interface. The same address is typically used for multiple third-party clients of the NCSP that subscribe to similar service(s) and thus the NCSP uses a same segment routing policy for these multiple customers.

In one embodiment, packets with a destination address of a host device 162 received by an edge node ISP-1 120 (e.g., from a non-NCSP customer such as, but not limited to, destination 150) are steered to an NCSP IP address of a physical or virtual network router within NCSP data center 110, NCSP cloud footprint 112, which also invokes a segment routing function of the NCSP for reaching host device 162. In one embodiment, an edge node of ISP-1 120 receives a packet addressed to an NCSP customer and encapsulates it in an IP encapsulating packet with an NCSP destination address. In one embodiment, multiple NCSP IP addresses are used to distinguish among different classifications of packet traffic.

For packet traffic between NCSP customers, the destination address of the IP encapsulating packet (encapsulating the original packet) will cause the IP encapsulating packet to be delivered to a node within NCSP data center 110 or NCSP cloud footprint 112, and invoke processing according to a corresponding segment routing function.

Operating according to a service function identified by the NCSP LP destination address of the received encapsulating packet, an SRv6 packet with segment identifiers defined by a corresponding segment routing policy is created that encapsulates the original packet (decapsulated from the received encapsulating packet).

In one embodiment, routing and/or forwarding information bases of routers within SP-1 120 are configured to forward packets addressed to IP addresses of NCSP customers to NCSP data center 110 or NCSP cloud footprint 112. A network router within NCSP data center 110 or NCSP cloud footprint 112 then performs packet classification to determine a corresponding segment routing policy, and creates this SRv6 packet encapsulating the received original packet.

This SRv6 packet is forwarded, typically with one or more network services applied, according to its segment identifiers, eventually arriving at an edge node in communication with network access device 161. The edge node decapsulates and sends the original packet to network access device 161 which delivers to host device 162 (or sends to network access device/host device 160).

Figure 1B:
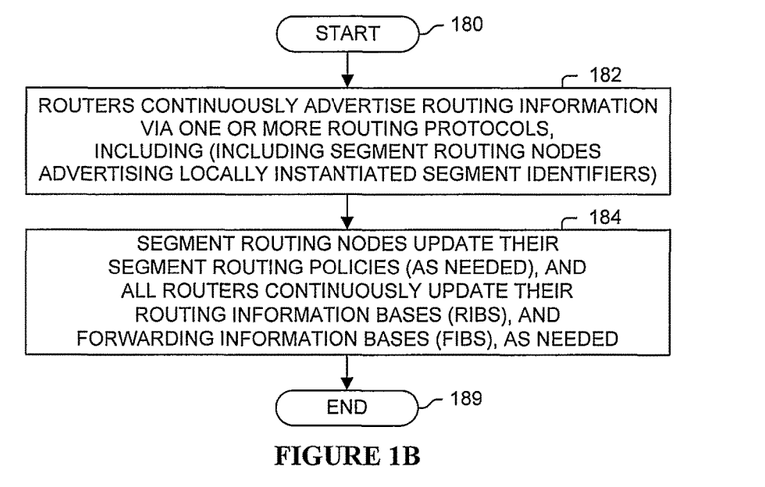
FIG. 1B illustrates a process according to one embodiment.

FIG. 1B illustrates a process according to one embodiment associated with providing network efficiencies in forwarding packets among provider networks and applying segment routing policies. Processing begins with process block 180. In process block 182, routers in the networks continuously advertise and exchange routing information including segment routing information (e.g., routes including segment identifiers of network nodes and their corresponding function or function/arguments, attributes of segment identifiers, attributes of node) and other routing information (e.g., IPv4 or IPv6 topology information) typically via one or more routing protocols and/or other protocols. In process block 184, segment routing and other network nodes continuously update their segment routing policies and routing information as required (e.g., based on information received via a routing or other protocol, from a network management system, etc.). Processing of the flow diagram of FIG. 1B is complete as indicated by process block 189.

Figure 2A:
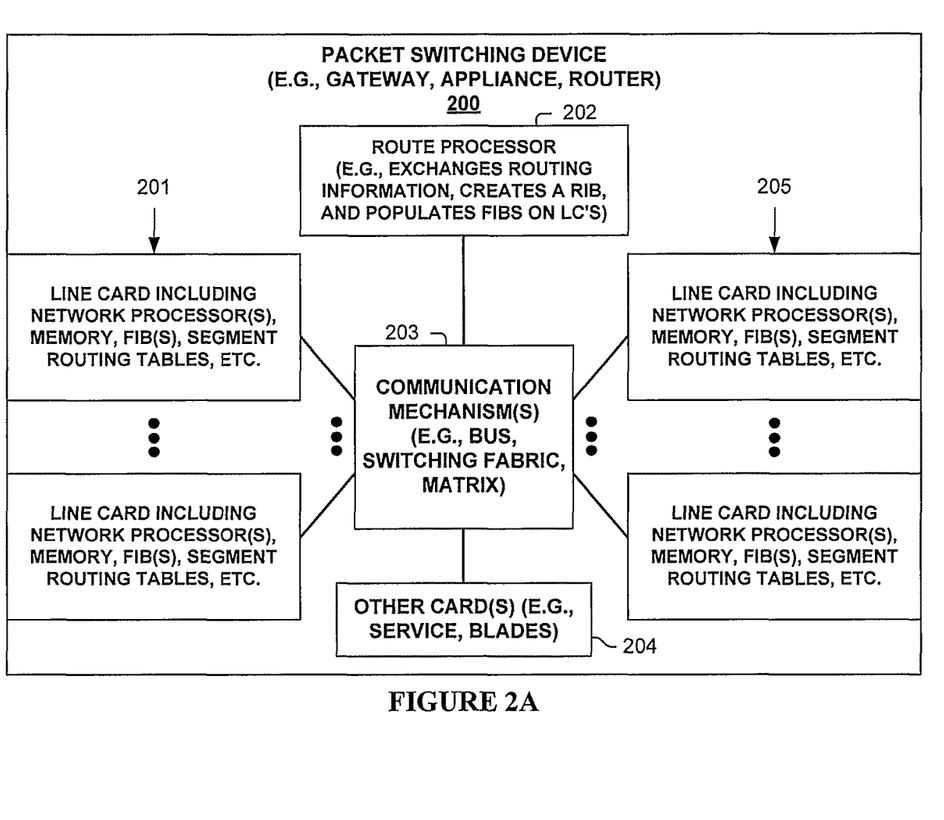
FIG. 2A illustrates a packet switching device according to one embodiment.
Figure 2B:
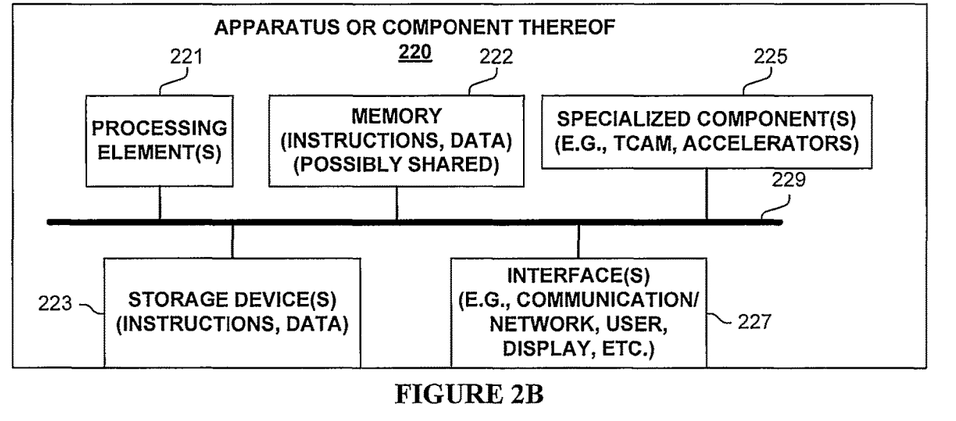
FIG. 2B illustrates an apparatus according to one embodiment.

FIGS. 2A-B and their discussion herein provide a description of various network nodes according to one embodiment.

FIG. 2A illustrates one embodiment of a packet switching device 200 according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with providing network efficiencies in forwarding packets among provider networks and applying segment routing policies. Packet switching device 200 also has a control plane with one or more processing elements 202 for managing the control plane and/or control plane processing of packets associated with providing network efficiencies in forwarding packets among provider networks and applying segment routing policies. Packet switching device 200 also includes other cards 204 (e.g., service cards, blades) which include processing elements that are used in one embodiment to process (e.g., forward/send, drop, manipulate, change, modify, receive, create, duplicate, perform SR functionality possibly with shared memory with one or more service functions, apply a service according to one or more service functions) packets associated with providing network efficiencies in forwarding packets among provider networks and applying segment routing policies, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, segment routing functions are implemented on line cards 201, 205.

FIG. 2B is a block diagram of an apparatus 220 (e.g., host, network access device, router, network node, destination) used in one embodiment associated with providing network efficiencies in forwarding packets among provider networks and applying segment routing policies. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup and/or packet processing operations and/or service function, associative memory, binary and/or ternary content-addressable memory, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
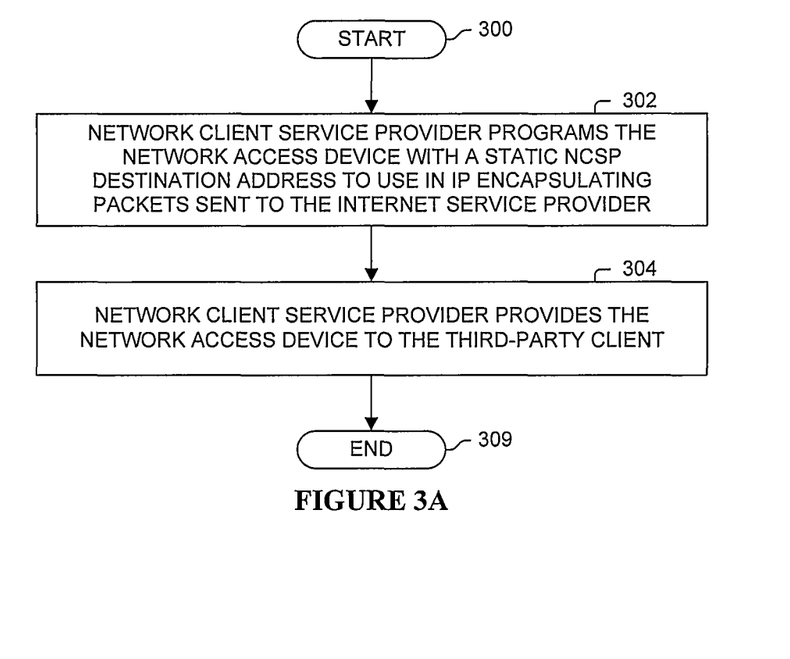
FIG. 3A illustrates a process according to one embodiment.

FIG. 3A illustrates a process according to one embodiment. Processing begins with process block 300. In process block 302, the network client service provider (NCSP) programs a network access device with the static NCSP destination address to use as the destination address for IP encapsulating packets sent to the Internet Service Provider. In process block 304, the NCSP provides the programmed network access device to the third-party client. Processing of the flow diagram of FIG. 3A is complete as indicated by process block 309.

Figure 3B:
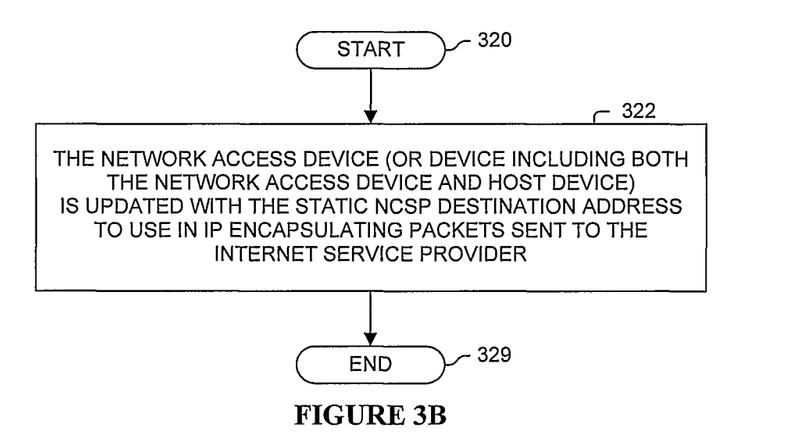
FIG. 3B illustrates a process according to one embodiment.

FIG. 3B illustrates a process according to one embodiment. Processing begins with process block 320. In process block 322, the network access device (or device including both the network access device and host device) is updated with the static NCSP destination address to use as the destination address for IP encapsulating packets sent to the Internet Service Provider. Processing of the flow diagram of FIG. 3B is complete as indicated by process block 329.

Figure 4A:
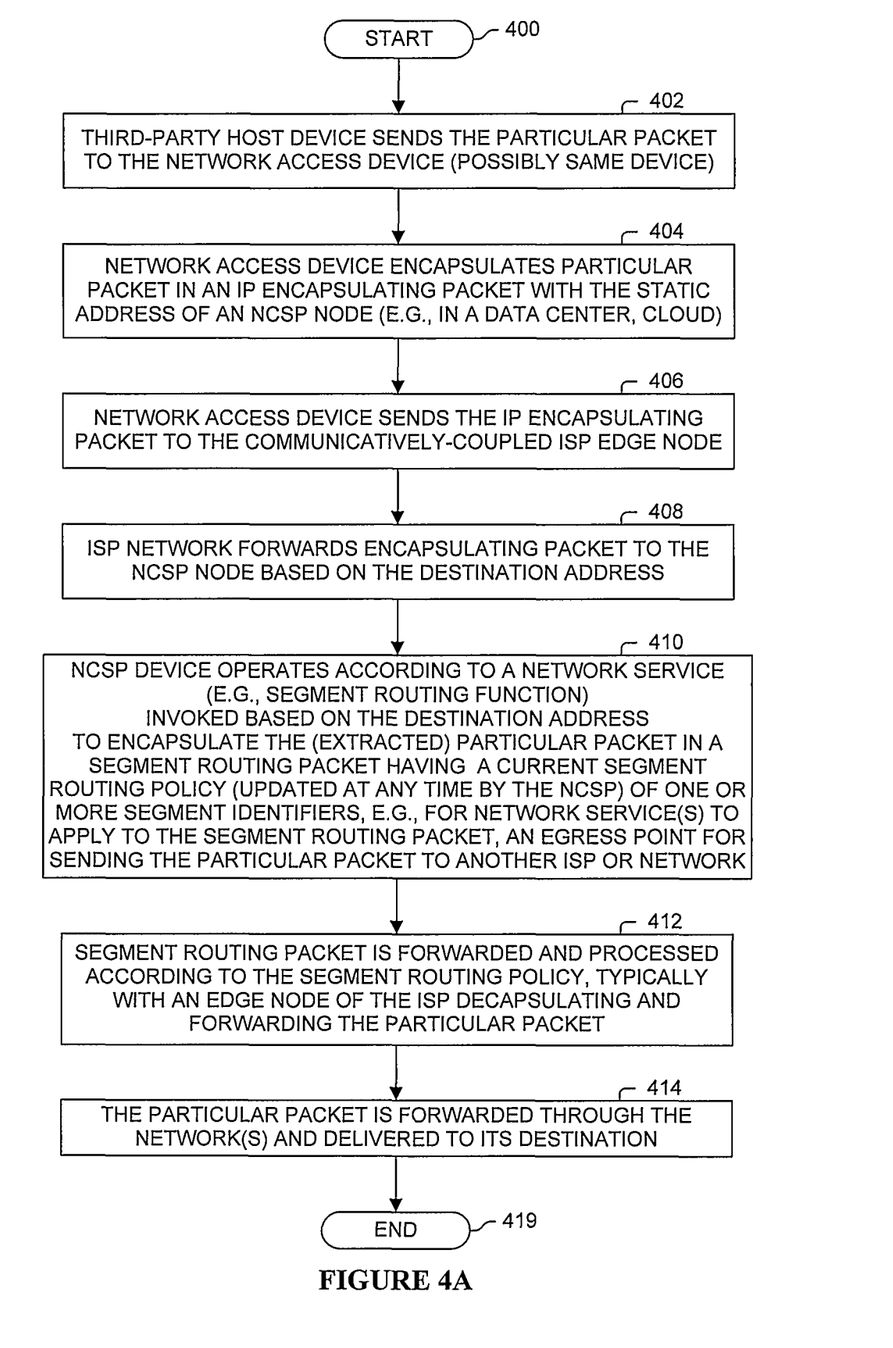
FIG. 4A illustrates a process according to one embodiment.

FIG. 4A illustrates a process according to one embodiment. Processing begins with process block 400. In process block 402, the third-party host device sends the particular packet to the network access device. In process block 404, the network access device encapsulates the particular packet in an IP encapsulating packet with the programmed static address of an NCPS network node (e.g., in a data center, cloud) as its destination address. In one embodiment, the IP encapsulating packet is an IPv6 packet. In one embodiment, the IP encapsulating packet is an SRv6 packet. In process block 406, the network access device sends the IP encapsulating packet to the edge node of the ISP. In process block 408, the ISP network forwards the encapsulating packet to the NCSP device based on the destination address.

In process block 410, the NCSP device operates according to a network service (e.g., segment routing function) invoked based on the destination address to encapsulate the extracted original packet in a segment routing packet (SRv6) having a current segment routing policy represented in a segment list of one or more segment identifiers that define including, but not limited to, network service(s) to apply to the segment routing packet, an egress point of the ISP from which to send the particular packet to another ISP or network.

The current segment routing policy is updated at any time (e.g., responsive to a change in service offering, network conditions, etc.) causing future SRv6 packets to be generated according to the updated segment routing policy specifying one or more different segment identifiers in the segment list. Thus, network service processing of packets received from multiple network access devices is updated by modifying this one network service (e.g., segment routing function), providing significant and substantial efficiencies to the network processing of packets (e.g., in contrast to updating each network access device to reflect the updated segment routing policy).

In process block 412, the segment routing packet is forwarded and processed according to the segment routing policy as defined by the segment identifiers, typically with an edge node of ISP decapsulating and forwarding the particular packet to another network. In process block 414, the particular packet is delivered to its destination. Processing of the flow diagram of FIG. 4A is complete as indicated by process block 419.

Figure 4B:
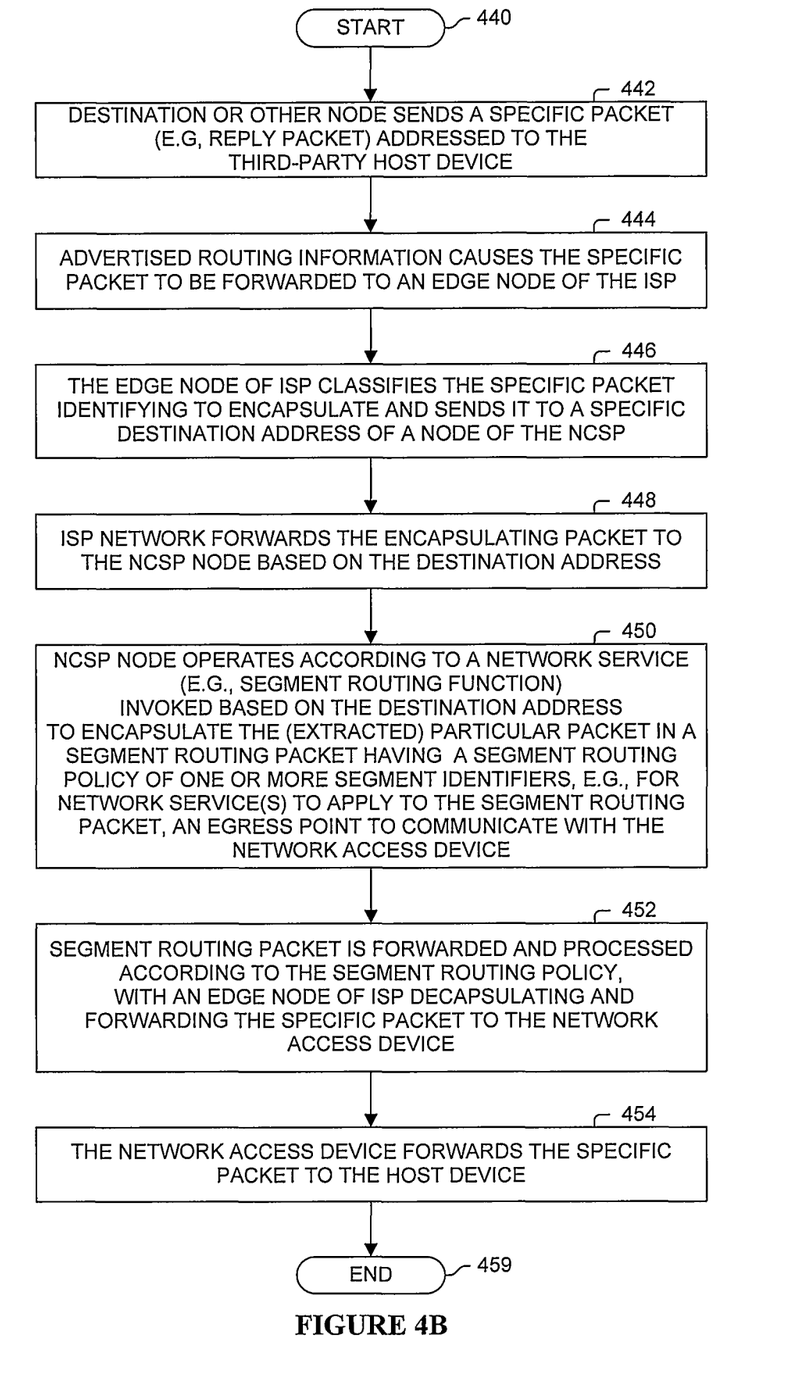
FIG. 4B illustrates a process according to one embodiment.

FIG. 4B illustrates a process according to one embodiment. Processing begins with process block 440. In process block 442, the destination or other network node sends a specific IP packet (e.g., a reply packet) addressed to the third-party host device. In process block 444, the routing information causes the specific packet to be forwarded to an edge node of the ISP (that used by the NCSP in providing its services). In process block 446, the edge node of the ISP classifies the specific packet (e.g., based on its destination address and possibly other fields of the header of the packet), and then in response, encapsulates the specific packet in an IP encapsulating packet with a destination address of a node of the NCSP (e.g., within a data center or cloud). In process block 448, the ISP network forwards the encapsulating packet to the NCSP node. In process block 450, the NCSP node operates according to a network service (e.g., segment routing function) invoked based on the destination address to encapsulate the (extracted) particular packet in a segment routing (SRv6) packet having a segment routing policy of one or more segment identifiers (e.g., for network service(s) to apply to the segment routing packet, an egress router from which to forward the particular packet to the network access device. In process block 452, the segment routing packet is forwarded and processed according to the segment routing policy, including an edge node of ISP decapsulating and forwarding the specific packet to the network access device. In process block 454, the network access device forwards the specific packet to the host device. Processing of the flow diagram of FIG. 4B is complete as indicated by process block 459.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
communicating a particular Internet Protocol (IP) packet from a host device of a third-party client to a network access device of the third-party client over a wireless or wired local area network, with the particular IP packet being addressed to a particular destination external to an Internet Service Provider (ISP), and with the network access device being located on the premises of the third-party client;
encapsulating, by the network access device, the particular IP packet in an Internet Protocol Version 6 (IPv6) encapsulating packet having a particular IP destination address in an outer IP header, with the particular IP destination address being a particular segment identifier of a particular network service provided by a particular network device of a network client service provider (NCSP) that uses network infrastructure and services of the ISP to provide communications services to the third-party client, with the particular IP destination address being an IP address of the particular network device, and with said communications services including Internet access via the network access device;
communicating the IPv6 encapsulating packet from the network access device to an edge router in a network of the ISP;
communicating the IPv6 encapsulating packet from the edge router to the particular network device located in a data center or cloud footprint of the NCSP;
receiving the IPv6 encapsulating packet by the particular network device;
responsive to the particular IP destination address of said received IPv6 encapsulating packet, the particular network device operating according to the particular network service that includes originating a particular segment routing IPv6 (SRv6) packet encapsulating the particular IP packet extracted from said received IPv6 encapsulating packet with the particular SRv6 packet including a particular segment list of one or more particular segment identifiers; and
sending the particular SRv6 packet into the network of the ISP.

2. The method of claim 1, comprising subsequent to the NCSP configuring the network access device to use the particular IP destination address as the IP destination address of the IP encapsulating packet, the NCSP providing the network access device to the third-party client; wherein the particular IP destination address is a predetermined static IP address.

3. The method of claim 1, comprising: responsive to receiving the SRv6 packet, an egress router in the network of the ISP decapsulating the particular IP packet from said received SRv6 packet and sending the particular packet from the egress router towards the particular destination.

4. The method of claim 3, comprising:
receiving a response IP packet by a router in the network of the ISP, with the response IP packet being a packet sent in response the particular IP packet by the particular destination;
in response to a classification of the response IP packet, the router encapsulating the response packet in a specific IPv6 encapsulating packet having a specific IP destination address of a specific network service of the NCSP, with the specific IP destination address being an IP address of a specific network device of the NCSP;
communicating the specific IPv6 encapsulating packet to the specific network device;
responsive to the specific IP destination address of the specific IPv6 encapsulating packet, the specific network device operating according to the specific network service that includes originating a specific SRv6 packet encapsulating the response IP packet extracted from said received specific IPv6 encapsulating packet;
communicating the specific SRv6 packet to the edge router;
sending the response IP packet decapsulated from the specific SRv6 packet by the edge router to the network access device; and
communicating the response IP packet from the network access device to the host device.

5. A method, comprising:
communicating a particular Internet Protocol (IP) packet from a host device of a third-party client to a network access device of the third-party client;

encapsulating, by the network access device, the particular IP packet in an Internet Protocol Version 6 (IPv6) encapsulating packet having a particular IP destination address in an outer IP header, with the particular IP destination address being a particular segment identifier of a particular network service provided by a particular network device of a network client service provider (NCSP) that uses network infrastructure and services of an Internet Service Provider (ISP) to provide communications services to the third-party client, with the particular IP destination address being an IP address of the particular network device;

communicating the IPv6 encapsulating packet from the network access device to an edge router in a network of the ISP;

communicating the IPv6 encapsulating packet from the edge router to the particular network device;

receiving the IPv6 encapsulating packet by the particular network device;

responsive to the particular IP destination address of said received IPv6 encapsulating packet, the particular network device operating according to the particular network service that includes originating a particular segment routing IPv6 (SRv6) packet encapsulating the particular IP packet extracted from said received IPv6 encapsulating packet with the particular SRv6 packet including a particular segment list of one or more particular segment identifiers; and sending the particular SRv6 packet into the network of the ISP;

receiving a second particular IP packet from the host device by the network access device communicatively coupled to a second edge router, different from the edge router, of the network of the ISP;

encapsulating, by the network access device, the second particular IP packet in a second IPv6 encapsulating packet having the particular IP destination address in an outer IP header; and communicating the second IPv6 encapsulating packet from the network access device to the second edge router.

6. A method, comprising:

communicating a plurality of Internet Protocol (IP) packets in a plurality of IP encapsulating packets via a network access device of a third-party client to a first or a second edge router of a network of an Internet Service Provider (ISP), with the IP source address of each of the plurality of IP packets being a host device of the third-party client, with each of the plurality of IP encapsulating packets including an outer IP header with a particular IP destination address identifying a particular network service provided by a particular network device of a network client service provider (NCSP) using network infrastructure and services of the ISP to provide communications services to the third-party client, with the particular IP destination address being an IP address of the particular network device; and for each particular IP encapsulating packet of said IP encapsulating packets that is received by the particular network device: based on the particular IP destination address identifying the particular network service, the particular network device processing said particular IP encapsulating packet according to the particular network service that includes generating a particular Segment Routing IP version 6 (SRv6) packet encapsulating said particular packet received in said particular IP encapsulating packet and with the particular SRv6 packet including a particular segment list of one or more particular segment identifiers corresponding to a current segment routing policy; and sending the SRv6 packet into the network of the ISP;

wherein the network access device is located on the premises of the third-party client; and wherein the network access device said receives the plurality of IP packets of the third party client from a plurality of hosts of the third-party.

7. The method of claim 6, wherein the network access device is configured, prior to any usage of the network access device by the third-party client, to use the particular IP destination address for said encapsulating of packets; and wherein said particular segment identifiers includes one or more additional segment identifiers of corresponding network services to be applied to the particular SRv6 packet.

8. The method of claim 6, comprising updating the current segment routing policy causing one or more of subsequently said generated particular SRv6 packets to include a different one or more particular segment identifiers in the particular segment list.

9. The method of claim 6, wherein the particular IP destination address is a segment identifier causing invocation of the particular network service on the particular network device.

10. The method of claim 6, wherein said particular IP encapsulating packet is an IP version 4 (IPv4) packet that includes an identification of a particular port number; and wherein said identifying the particular network service is further based on the particular port number.

11. The method of claim 6, wherein the particular network device is a virtual router implemented on a server in a data center or on a cloud service.

12. The method of claim 6, comprising:

the host device sending the plurality of IP packets to the network access device; and the network access device encapsulating the plurality of IP packets into the plurality of IP encapsulating packets.

13. The method of claim 6, wherein the network access device is the host device; and the method includes the host device originating each of the plurality of IP encapsulating packets.

14. A method, comprising:

communicating a plurality of Internet Protocol (IP) packets in a plurality of IP encapsulating packets via a network access device of a third-party client to a first or a second edge router of a network of an Internet Service Provider (ISP), with the IP source address of each of the plurality of IP packets being a host device of the third-party client, with each of the plurality of IP encapsulating packets including an outer IP header with a particular IP destination address identifying a particular network service provided by a particular network device of a network client service provider (NCSP) using network infrastructure and services of the ISP to provide communications services to the third-party client, with the particular IP destination address being an IP address of the particular network device; and for each particular IP encapsulating packet of said IP encapsulating packets that is received by the particular network device: based on the particular IP destination address identifying the particular network service, the particular network device processing said particular IP encapsulating packet according to the particular network service that includes generating a particular Segment Routing IP version 6 (SRv6) packet encapsulating said particular packet received in said particular IP encapsulating packet and with the particular SRv6 packet including a particular segment list of one or more particular segment identifiers corresponding to a current segment routing policy; and sending the SRv6 packet into the network of the ISP;

wherein the network access device connectivity to the network of the ISP is changed from the first edge router of the ISP to the second edge router of the ISP such that a first plurality portion of the plurality of IP encapsulating packets are communicated to the first edge router and a second plurality portion of the plurality of IP encapsulating packets are communicated to the second edge router.

15. The method of claim 14, comprising:
the host device sending the plurality of IP packets to the network access device; and
the network access device encapsulating the plurality of IP packets into the plurality of IP encapsulating packets.

16. The method of claim 14, wherein the network access device is the host device; and the method includes the host device originating each of the plurality of IP encapsulating packets.

17. A method, comprising:
communicating a plurality of Internet Protocol (IP) packets in a plurality of IP encapsulating packets via a network access device of a third-party client to a first or a second edge router of a network of an Internet Service Provider (ISP), with the IP source address of each of the plurality of IP packets being a host device of the third-party client, with each of the plurality of IP encapsulating packets including an outer IP header with a particular IP destination address identifying a particular network service provided by a particular network device of a network client service provider (NCSP) using network infrastructure and services of the ISP to provide communications services to the third-party client, with the particular IP destination address being an IP address of the particular network device; and for each particular IP encapsulating packet of said IP encapsulating packets that is received by the particular network device: based on the particular IP destination address identifying the particular network service, the particular network device processing said particular IP encapsulating packet according to the particular network service that includes generating a particular Segment Routing IP version 6 (SRv6) packet encapsulating said particular packet received in said particular IP encapsulating packet and with the particular SRv6 packet including a particular segment list of one or more particular segment identifiers corresponding to a current segment routing policy; and sending the SRv6 packet into the network of the ISP;

wherein the network of the ISP is connected to a different network of a different ISP via a third edge router in the network of the ISP; and wherein said particular segment identifiers include a particular segment identifier which is an IP address of the third edge router; and wherein the method includes for each particular SRv6 packet of a plurality said SRv6 packets:

receiving said particular SRv6 packet with a destination address of the particular segment identifier by the third edge router from the network of the ISP;
decapsulating said particular packet from said particular SRv6 packet by the third edge router; and
sending from the third edge router said particular packet to the different network of the different ISP.

18. A method, comprising:
communicating a plurality of Internet Protocol (IP) packets in a plurality of IP encapsulating packets via a network access device of a third-party client to a first or a second edge router of a network of an Internet Service Provider (ISP), with the IP source address of each of the plurality of IP packets being a host device of the third-party client, with each of the plurality of IP encapsulating packets including an outer IP header with a particular IP destination address identifying a particular network service provided by a particular network device of a network client service provider (NCSP) using network infrastructure and services of the ISP to provide communications services to the third-party client, with the particular IP destination address being an IP address of the particular network device;

for each particular IP encapsulating packet of said IP encapsulating packets that is received by the particular network device: based on the particular IP destination address identifying the particular network service, the particular network device processing said particular IP encapsulating packet according to the particular network service that includes generating a particular Segment Routing IP version 6 (SRv6) packet encapsulating said particular packet received in said particular IP encapsulating packet and with the particular SRv6 packet including a particular segment list of one or more particular segment identifiers corresponding to a current segment routing policy; and sending the SRv6 packet into the network of the ISP;

for each specific packet of a plurality of specific IP packets with an IP destination address of the host device and received by a specific edge router of the ISP, the specific edge routing encapsulating said specific packet in a specific IPv6 encapsulating packet with a specific destination address of a specific network device of the NCSP, and sending the specific IPv6 into the network of the ISP;

for each specific IP encapsulating packet of a plurality of said specific IP encapsulating packets received by the specific network device and based on the specific IP destination address identifying a specific segment routing network service, the specific network device processing said specific IP packet according to the specific segment routing network service that includes generating a specific SRv6 packet encapsulating said specific packet received in said specific IP encapsulating packet and with the specific SRv6 packet including a specific segment list of one or more specific segment identifiers, with the specific SRv6 packet being sent into the network of the ISP; and for each said specific SRV6 packet received by a second specific edge router of the ISP, the second specific edge router decapsulating and sending said specific IP packet to the network access device.

* * * * *

UNITED STATES PATENT AND TRADEMARK OFFICE
CERTIFICATE OF CORRECTION

PATENT NO. : 10,757,231 B2
APPLICATION NO. : 15/981232
DATED : August 25, 2020
INVENTOR(S) : Filsfils et al.

It is certified that error appears in the above-identified patent and that said Letters Patent is hereby corrected as shown below:

In the Specification

Column 6, Line 29, "LP" should read --IP--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*